(No Model.)
J. McINTYRE.
REFRIGERATING SHIP.
No. 497,595. Patented May 16, 1893.
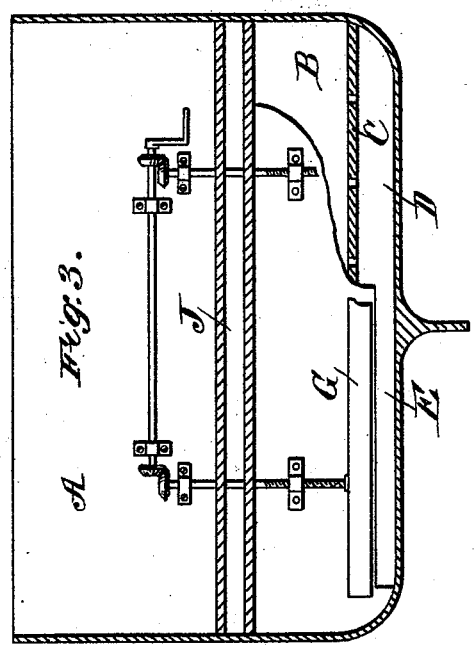
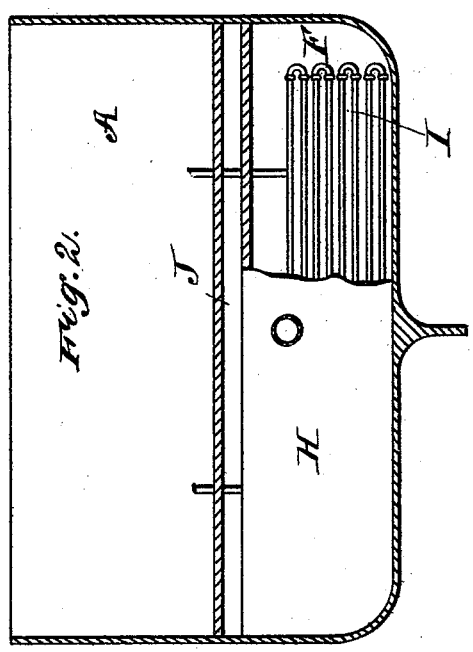
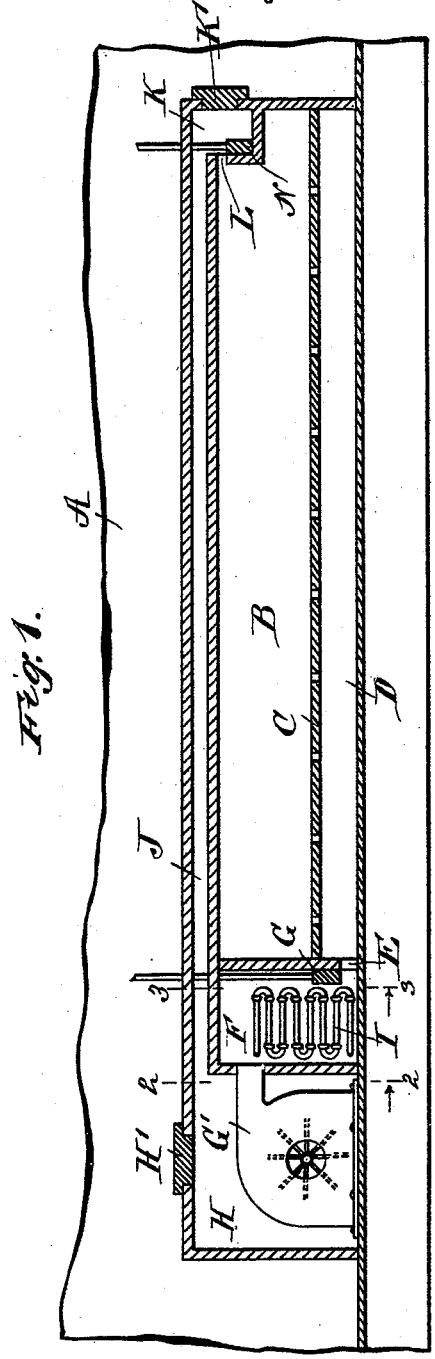
WITNESSES:
J. A. Bergstrom
C. Sedgwick
INVENTOR
J. McIntyre
BY Munn & Co
ATTORNEYS.

UNITED STATES PATENT OFFICE.

JOHN McINTYRE, OF JERSEY CITY, NEW JERSEY.

REFRIGERATING-SHIP.

SPECIFICATION forming part of Letters Patent No. 497,595, dated May 16, 1893.

Application filed October 26, 1892. Serial No. 450,014. (No model.)

*To all whom it may concern:*

Be it known that I, JOHN MCINTYRE, of Jersey City, in the county of Hudson and State of New Jersey, have invented a new and Improved Refrigerating-Ship, of which the following is a full, clear, and exact description.

The object of the invention is to provide a new and improved refrigerating ship, which is simple and durable in construction, and is more especially designed to keep the compartment containing fruit, meat and other perishable freight properly ventilated and at a uniform low temperature.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a longitudinal section of the improvement. Fig. 2 is a transverse section of the same on the line 2—2 of Fig. 1; and Fig. 3 is a like view of the same on the line 3—3 of Fig. 1.

The vessel A, is provided with a storage compartment B, in which the fruit, meat or other perishable freight is placed in any suitable manner. This compartment B is provided with a perforated bottom C, below which is formed an air distributing chamber D, provided at the front end with an air inlet opening E, extending the entire width of the front end, as is plainly shown in Fig. 3. The inlet opening E connects the air distributing chamber D with an air spreading chamber F, and over the opening E operates a valve G, for increasing or diminishing the opening to admit more or less air to the air distributing chamber D from the said spreading chamber F. This spreading chamber F is built on the front end of the compartment B, as is plainly shown in Fig. 1, and is connected with the discharge end of a blower G', of any approved construction and located in a blower chamber H, arranged next to the spreading chamber F. When the blower is first started, the valve G is closed so that the air accumulates under a desired pressure in the chamber F and when the desired pressure is reached, the valve G is opened to permit the air to pass uniformly through the opening E into the distributing chamber D. The blower then maintains the desired pressure of air in the chamber F so that the latter is filled at all times with air under certain pressure; the air being spread uniformly in all parts of the chamber. In the chamber F is arranged a coil of pipe I, through which a cooling fluid is forced by means of pumps or other mechanism, so that the air discharged by the blower G' and passing over the said coil of pipe I is reduced in temperature before it passes into the distributing chamber D.

The blower chamber H is connected by a passageway J, with an air outlet chamber K, arranged on the end of the storage chamber B opposite the end on which the spreading chamber F is located. This chamber K is preferably arranged at the top and connects by an outlet opening L, with the compartment B, so that the air from the latter can pass into the chamber K and from the latter returns through the passage J into the blower chamber H, to be again taken up by the blower and forced into the spreading chamber F and through the opening E into the air distributing chamber D, to pass through the perforations in the bottom C to the compartment B. Over the outlet opening L operates a valve N, for increasing and diminishing the said opening to regulate the outflow of the air from the compartment B.

In case the refrigerating coil I is not used and it is only desired to circulate fresh air through the compartment B, then the chamber H is opened to the outer air by removing a suitable cap H', held on the top of the chamber, as shown in Fig. 1. A like cap K', is removed from the spreading chamber K, so that air drawn into the blower chamber H from the outside by the blower G', is forced through the spreading chamber F, the distributing chamber D and the storage chamber B, and its contents, to finally pass through the opening L in the air outlet chamber K, and out of the same through the opening left by the removed cap K'.

As shown in Fig. 3, the valve G can be raised or lowered by suitable mechanism, but I do not limit myself to the especial mechanism shown.

The openings E and L extend throughout the width of the chambers F, D and B, respectively, so that the air passes from the spreading chamber F in sheet form to the distributing chamber D, from which it rises uniformly through the perforated bottom C into all parts of the storage compartment B. The air is drawn from the latter in sheet form through the outlet opening L into the air outlet chamber, to be either returned to the blower as above described or permitted to escape to the outer air in case the cap K' is removed as above described.

It will be understood that the perforated false bottom and the inlet openings extending across the entire width of the chambers, are very essential features to insure a uniform distribution and movement of air in the storage compartment B, so that all the air is kept in constant motion and no foul air pockets are formed in any part of the said storage compartment. It is also understood that the air would not spread through the entire length, width and height of the storage compartment B, if the floor of the latter had only an ordinary hatch opening of sufficient area to allow the entering reduced volume of air to pass through it, as the air would then seek a direct route to the outlet opening, and only a small part of the compartment B would be ventilated and cooled, and foul air pockets would be formed.

The movement of the air may be reversed by connecting the mouth of the blower G' with the channel J, and uniting the chambers F and H. In this case the functions of the chambers F and K are reversed that is the chamber F will be the air outlet chamber for the storage compartment while the air outlet chamber K will become the air spreading chamber. It is understood that the air in this case would be forced by the blower through channel J to chamber K into the storage compartment B, and descend in the same to the distributing chamber D to finally pass into the chambers F, H and back to the blower, to be used over again.

Having thus fully described my invention, I claim as new and desire to secure by Letters Patent—

1. A refrigerating ship comprising a storage compartment having a false perforated bottom extending throughout the length and width of the said storage compartment to form an air distributing chamber under the said storage compartment, an air spreading chamber located at one end of the said storage compartment and having a transverse valved opening leading to the said air distributing chamber, at one end thereof, an air outlet chamber arranged on the other end of the said storage compartment and connected by a valved transverse opening with the upper end of the said storage compartment, and a blower discharging into the said air spreading chamber to fill the latter with air under pressure in all its parts and to maintain a uniform pressure of air therein when the said valved transverse opening of the air spreading chamber connects the latter with the said air distributing chamber, substantially as shown and described.

2. A refrigerating ship comprising a storage compartment having a false perforated bottom extending throughout the length and width of the said storage compartment to form an air distributing chamber under the said storage compartment, an air spreading chamber located at one end of the said storage compartment and having a transverse valved opening leading to the said air distributing chamber, at one end thereof, an air outlet chamber arranged on the other end of the said storage compartment and connected by a valved transverse opening with the upper end of the said storage compartment, a blower discharging into the said air spreading chamber to fill the latter with air under pressure in all its parts, and to maintain a uniform pressure of air therein when the said valved transverse opening of the air spreading chamber connects the latter with the said air distributing chamber, and a coil of pipe arranged in the said spreading chamber and through which passes a cooling medium to reduce the temperature of the air passing through the said spreading chamber, substantially as shown and described.

JOHN McINTYRE.

Witnesses:
 THEO. G. HOSTER,
 C. SEDGWICK.